United States Patent
Roders et al.

(10) Patent No.: US 9,598,920 B2
(45) Date of Patent: Mar. 21, 2017

(54) DRILLING APPARATUS INCLUDING A FLUID BYPASS DEVICE AND METHODS OF USING SAME

(71) Applicants: Ingo Roders, Seelze (DE); Thorsten Regener, Wienhausen (DE)

(72) Inventors: Ingo Roders, Seelze (DE); Thorsten Regener, Wienhausen (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/823,382

(22) Filed: Aug. 11, 2015

(65) Prior Publication Data

US 2015/0345240 A1    Dec. 3, 2015

Related U.S. Application Data

(63) Continuation-in-part of application No. 13/229,099, filed on Sep. 9, 2011, now Pat. No. 9,103,180.

(51) Int. Cl.
*E21B 21/10* (2006.01)
*G05D 7/06* (2006.01)

(52) U.S. Cl.
CPC ......... *E21B 21/103* (2013.01); *G05D 7/0617* (2013.01)

(58) Field of Classification Search
CPC ...... E21B 21/103; E21B 44/00; E21B 21/106; G05D 7/0617
See application file for complete search history.

(56) References Cited

U.S. PATENT DOCUMENTS

| | | |
|---|---|---|
| 4,396,071 A | 8/1983 | Stephens |
| 7,299,880 B2 | 11/2007 | Logiudice et al. |
| 7,518,950 B2 | 4/2009 | Treviranus et al. |
| 7,806,203 B2 | 10/2010 | Krueger et al. |
| 8,267,197 B2 | 9/2012 | Fiincher et al. |
| 2002/0148645 A1 | 10/2002 | Falgout, Sr. |
| 2005/0098349 A1 | 5/2005 | Krueger et al. |
| 2006/0011354 A1 | 1/2006 | Logiudice et al. |

(Continued)

FOREIGN PATENT DOCUMENTS

GB    WO 2011004180 A2 *    1/2011 ......... E21B 41/0085

OTHER PUBLICATIONS

PCT International Search Report and Written Opinion; International Application No. PCT/US2012/053158; International Filing Date: Aug. 30, 2012; Date of Mailing: Feb. 15, 2013, pp. 1-10.

*Primary Examiner* — Michael Wills, III
(74) *Attorney, Agent, or Firm* — Cantor Colburn LLP (57) ABSTRACT

A method and apparatus for drilling a wellbore is disclosed. The wellbore is drilled with a drill string that includes a bypass device having a fluid passage therethrough by supplying a fluid through the bypass device at a first flow rate, wherein the fluid circulates to a surface location via an annulus between the drill string and the wellbore. The flow rate of the fluid is altered to a second flow rate. A time period is defined and a mechanical motion of the bypass device is initiated. A parameter related to the mechanical motion of the bypass device and a parameter related to flow rate are detected. The bypass device is activated to divert a portion of the fluid to the annulus when the parameter related to mechanical motion is detected and the parameter related to flow rate is present during the defined time period.

15 Claims, 5 Drawing Sheets

(56) References Cited

U.S. PATENT DOCUMENTS

| | | |
|---|---|---|
| 2008/0196903 A1 | 8/2008 | Wardley et al. |
| 2009/0056952 A1 | 3/2009 | Churchill et al. |
| 2009/0250225 A1 | 10/2009 | Zaeper et al. |
| 2010/0025111 A1 | 2/2010 | Gearhart et al. |

\* cited by examiner

DRILLING APPARATUS INCLUDING A FLUID BYPASS DEVICE AND METHODS OF USING SAME

CROSS REFERENCE TO RELATED APPLICATIONS

The present application is a continuation-in-part of U.S. patent application Ser. No. 13/229,099, filed on Sep. 9, 2011, now U.S. Pat. No. 9,103,180 issued on Aug. 11, 2015, the contents of which are incorporated herein by reference in their entirety.

BACKGROUND OF THE DISCLOSURE

1. Field of the Disclosure

The present disclosure relates to apparatus and methods for diverting fluid in downhole tool applications.

2. Background

Wellbores are drilled in earth's formations using a drill string to produce hydrocarbons (oil and gas) from underground reservoirs. The wells are generally completed by placing a casing (also referred to herein as a "liner" or "drilling tubular") in the wellbore. The spacing between the liner and the wellbore inside (referred to as the "annulus") is then filled with cement. The liner is perforated to allow the hydrocarbons to flow from the reservoirs to the surface via production equipment installed inside the liner. Some wells are drilled with drill strings that also include a liner. Such drill strings include an outer string that is made with the liner. The inner string is typically a drill string that includes a drill bit, a bottomhole assembly and a steering device. The inner string is placed inside the outer string and securely attached therein at a suitable location. The drill bit, bottom hole assembly and steering device extend past the liner to drill a deviated well. To drill a wellbore with such a drill string, a drilling fluid (also referred to as "mud") is supplied to the inner string. The drilling fluid discharges at the bottom of the drill bit and returns via the annulus to the surface. During drilling, both the drill bit and the reamer disintegrate the rock formation into small pieces referred to as the cuttings, which flow with the circulating fluid to the surface via the annulus between the liner and the wellbore wall. In certain cases and particularly in highly deviated wells, the cuttings tend to settle at the low side of the wellbore and the flow rate of the circulating fluid is not adequate to cause the cuttings to efficiently flow to the surface. In other cases, it is desired to reduce pressure at the bottom of the wellbore, referred to as equivalent circulation density ("ECD").

The disclosure herein provides apparatus and methods for drilling wellbore while hole cleaning and for controlling the ECD.

SUMMARY OF THE DISCLOSURE

In one aspect, the disclosure provides a method of drilling a wellbore, which method, in one embodiment, includes the features of: drilling the wellbore with a drill string that includes a bypass device having a fluid passage therethrough by supplying a fluid through the bypass device at a first flow rate, wherein the fluid circulates to a surface location via an annulus between the drill string and the wellbore; altering the flow rate of the fluid from the first flow rate to a second flow rate; defining a time period; initiating a mechanical motion of the bypass device; detecting downhole a parameter related to the mechanical motion of the bypass device and detecting a parameter related to flow rate; and activating the bypass device to divert a portion of the fluid to the annulus when the parameter related to mechanical motion of the bypass device is detected and the parameter related to flow rate is present during the defined time period.

In another aspect, the disclosure provides a method of drilling a wellbore, which method includes: drilling the wellbore with a drill string that includes a bypass device having a fluid passage therethrough by supplying a fluid through the bypass device, wherein the fluid circulates to a surface location via an annulus between the drill string and the wellbore; defining a time period; altering a parameter related to flow rate according to a selected flow pattern, wherein the flow pattern includes the parameter related to flow rate crossing a first level and the parameter related to flow rate crossing a second level within the defined time period; determining downhole the selected flow pattern; and activating the bypass device to divert the fluid from the drill string to the annulus when the selected flow pattern occurs within the defined time period.

In another aspect, the disclosure provides an apparatus for use in a wellbore downhole, the apparatus including: a bypass device having a passage, wherein the bypass device is configured to pass a fluid supplied thereto through the passage when it is in a closed position and divert a portion of the fluid to an annulus between the bypass device and the wellbore when it is in an open position; a first sensor configured to measure a parameter related to flow rate; a second sensor configured to measure a parameter related to a mechanical motion of the bypass device; and a controller configured to open the bypass device to divert the portion of the fluid from the bypass device to the annulus when the parameter related to mechanical motion of the bypass device is detected and the parameter related to flow rate is present within a selected time period.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

DESCRIPTION OF THE DRAWINGS

For detailed understanding of the present disclosure, references should be made to the following detailed description, taken in conjunction with the accompanying drawings, in which like elements have been given like numerals and wherein.

DETAILED DESCRIPTION OF THE DISCLOSURE

Figure 1:
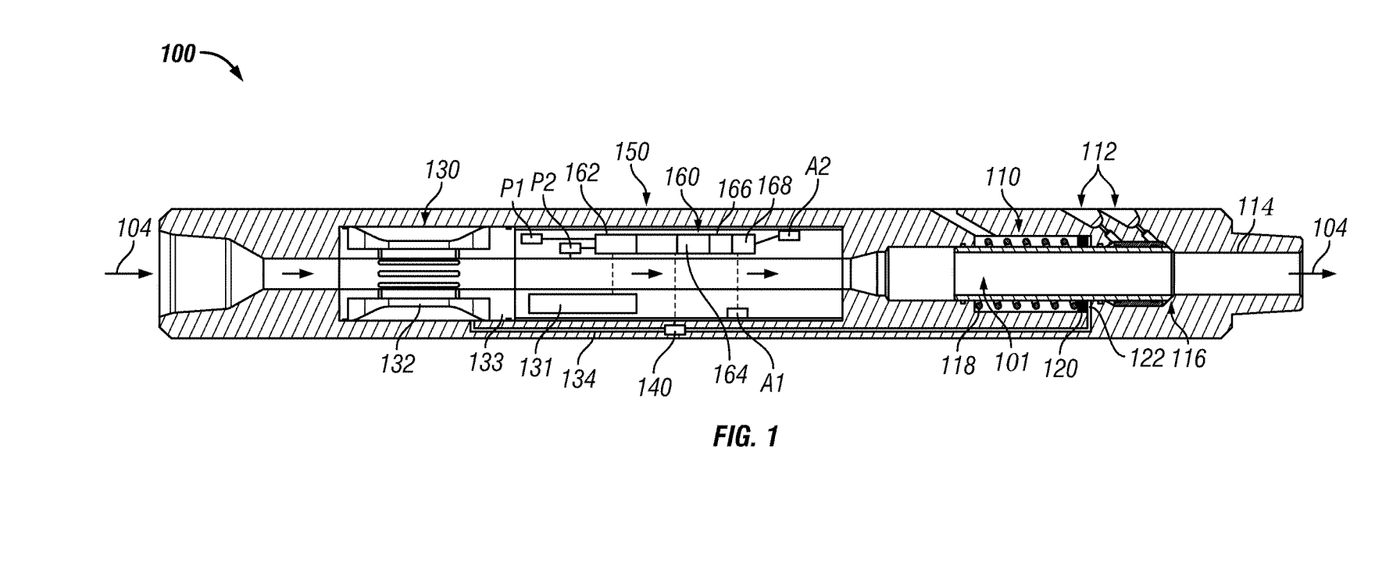
FIG. 1 is a plan view of a bypass device with a bypass valve in a closed position made according to one embodiment of the disclosure.

FIG. 1 is a line drawing of a fluid bypass device 100 (also referred herein as the "flow diverter") in a closed position, made according to one embodiment of the disclosure. In aspects, the bypass device 100 has a passage 101 that allows a fluid 104, such as drilling fluid supplied from the surface, to pass therethrough. The bypass device 100 includes a body 102 that houses a bypass valve 110 that in an open position (also referred to herein as the "activated" position) allows a portion of the fluid 104 to flow from the inside of the bypass device 100 to a location outside the bypass device, such as annulus between the bypass device 100 and a wellbore. The bypass device 100 further includes a hydraulic unit 130 configured to open and close the bypass valve 110 and a control circuit (also referred to herein as the "controller") 150 configured to control the operation of the hydraulic unit 130 in response to one or more parameters of interest. In aspects, the bypass valve 110 includes bypass nozzles 112 that, in an open position, allow a portion of the fluid 104 to flow from inside of the bypass valve 110 to the outside of the bypass valve 110. The bypass valve 110 further includes a bypass sleeve (or sleeve) 114 that is urged against a bypass valve seat (or seat) 116 by a biasing member 118, such as a spring. The hydraulic unit 130 includes a hydraulic fluid reservoir or reservoir 132 that contains a hydraulic fluid 133, which fluid may be a substantially non-compressible fluid, such as oil. The hydraulic fluid 133 in the reservoir 132 is in fluid communication with the sleeve 114 via a fluid line 134. Sleeve 114 may be moved axially via an axial movement of piston 120 due to fluid in fluid chamber 122. A flow control device 140, such as a two-way valve, in the fluid line 134 controls the flow of the hydraulic fluid 133 between the bypass valve 110 and the reservoir 132. The control circuit 150, in aspects, may include main electronics 160 and a power source, such as a battery. A pair of pressure sensors P1 and P2 associated with the bypass device 100 respectively provide signals or information relating to pressure of the fluid 104 inside and the medium outside the bypass device 100, which information may be used to determine the flow rate of the fluid through the bypass valve 110 and/or pressure differential between the inside and outside of the bypass device 100 and/or to determine presence variations in the pressure or flow of fluid 104 flowing through the bypass device 100. In aspects, the pressure variations may be induced in the fluid 104 at the surface by a suitable device, including, but not limited to, a mud pump, fluid bypass valve in a line supplying fluid 104 to the bypass device 100 and another device that induces pressure pulses in the fluid (referred to herein as a "pulser"). Such pulsers may include a rotating pulser, an oscillating pulser, a poppet-type pulser, etc. A differential pressure sensor or another device may also be utilized to determine the pressure differential between the inside and outside of the bypass device 100. The accelerometers A1 and A2 are provided to determine a mechanical motion of the bypass device 100 or another member associated therewith, such as a drilling assembly coupled to the bypass device 100. The mechanical motion of the bypass device 100 may be a linear motion, such as an axial motion of the bypass device 100 along a longitudinal axis of the bypass device 100, or a rotation of the bypass device 100 about the longitudinal axis of the bypass device 100. Any other device may also be utilized to determine the mechanical motion, such as hall-effect sensors, magnetic sensors, etc. The main electronics 160 may include a circuit 162 for receiving signals from the sensors, such as sensors P1, P2, A1 and A2, condition such signals (such as by pre-amplifying analog signals generated by the sensors) and digitize the conditioned signals. The main electronics 160 may further include a processor 164, such as microprocessor, a storage device 166, such as a solid-state memory and programs and instructions 168, accessible to the processor 164 for processing the digitized signals and controlling the operation of the bypass valve 110. The opening and closing of the bypass valve 110 is described in reference to FIGS. 2-4.

Figure 2:
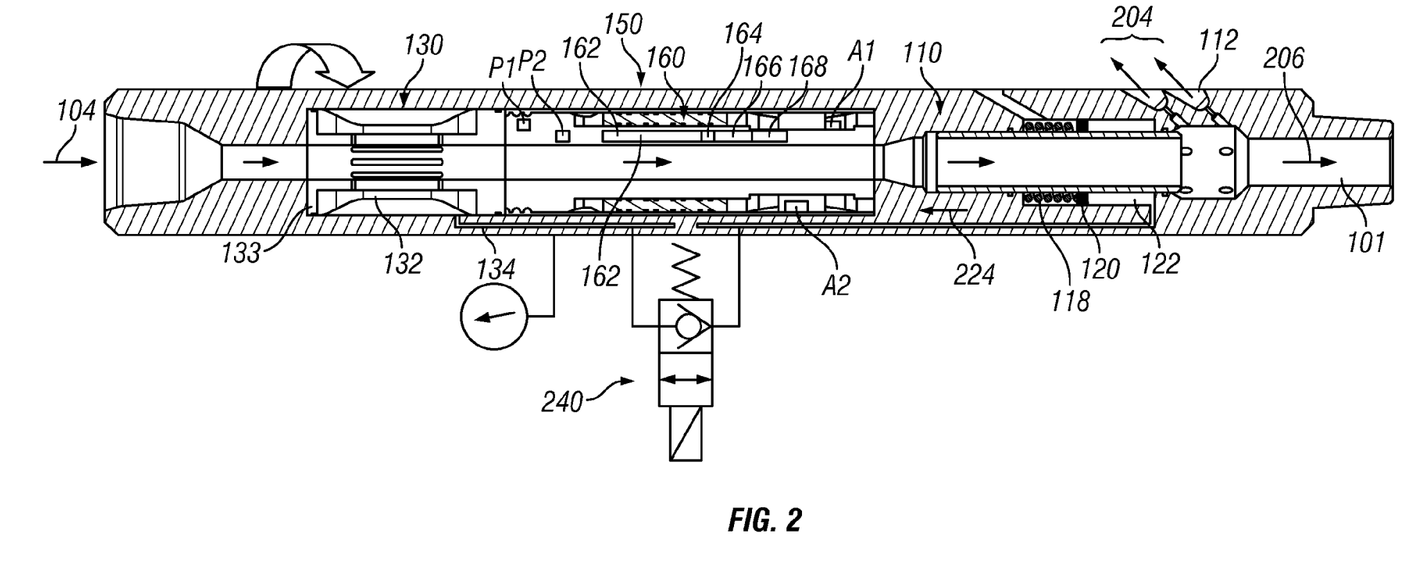
FIG. 2 is a plan view of the bypass device shown in FIG. 1 with the bypass valve in an open position, according to one embodiment of the disclosure.

FIG. 2 is a line drawing of the bypass valve shown in FIG. 1 in an open position, according to one embodiment of the disclosure. To divert or bypass a portion 204 of the fluid 104 flowing through the bypass device 100a, the control circuit 160 in response to one or more parameters of interest causes the flow control device 240 to open, which causes the hydraulic fluid 133 to flow under pressure from the reservoir 132 to the fluid chamber 122. The fluid entering the fluid chamber 122 causes the piston 120 to compress the biasing member 118, which moves the sleeve 114 away from the seat 116, which opens or activates the bypass valve 110 and allows the portion 204 of the fluid 104 to pass to the outside of the bypass device 100a. The internal dimensions of the passage 101 inside the bypass valve 110 may be configured so that the bypass fluid 204 amount depends upon the flow rate of the fluid 104 supplied from the surface. Closing or deactivating the flow control device 240 releases pressure on the piston 120 applied by the hydraulic fluid 133 from the fluid chamber 122, which allows the biasing member 118 to move the piston 120 and thus the sleeve 114 toward the seat 116 that closes the bypass valve 110. In aspects, the flow control device 240 may be any two-way fluid control device, such as a solenoid valve.

Figure 2A:
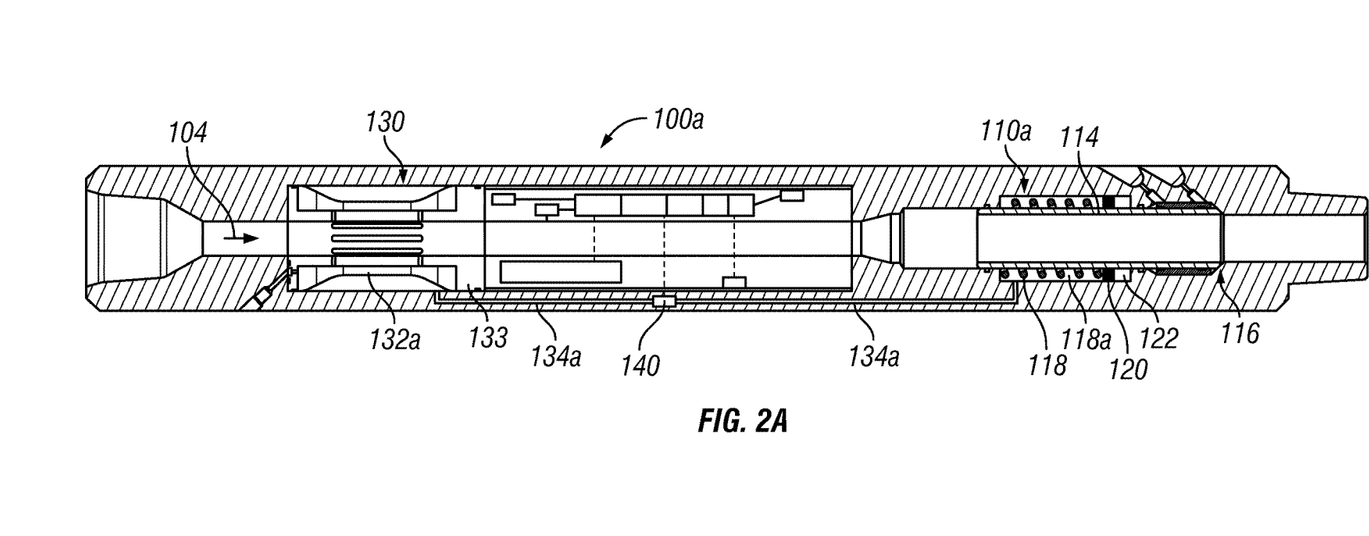
FIG. 2A is a plan view of a bypass device shown in FIG. 1 that utilizes an alternative mechanism for activating and deactivating the bypass valve.

FIG. 2A is a plan view of a bypass device 100b, similar to the bypass device 100 shown in FIG. 1, that utilizes an alternative mechanism for activating and deactivating the bypass valve 110a. The bypass device 100b includes a hydraulic fluid reservoir 132a that is in communication with the annulus of the wellbore and therefore is pressure compensated by the annulus pressure. The hydraulic fluid reservoir 132a, therefore, is at a lower pressure than the pressure inside the bypass device 100b created by the fluid 104 flowing through the bypass device 100b. Flow control device 140 is in line 134 between the hydraulic fluid reservoir 132a and the biasing member chamber 118a. The tool 100b may be run into the wellbore with the flow control device 140 in a closed position, thereby holding the bypass valve 110a in a closed position. The fluid chamber 122 is in contact with the inner bore of the tool 100b. In this configuration, the piston 120 is biased by the pressure of the fluid 104 flowing through the bypass valve 110a, which is higher than the annulus pressure acting on the reservoir 132a. When the flow control device 140 is in a closed position, hydraulic fluid is trapped in the biasing member chamber 118a, thereby preventing motion of the piston 120. In order to open the bypass valve 110a, flow control device 140 is placed in an open position in order to allow the hydraulic fluid 133 from the biasing member chamber 118a to flow to the hydraulic fluid reservoir 132a. To close or deactivate the bypass valve 110a, hydraulic fluid 133 from the reservoir 132a is pumped under pressure into the biasing member chamber 118a containing the biasing member 118 via line 134a and hydraulic pump 142 while the two-way flow control device 140 is closed (de-activated). This causes the piston 120 to move to the far right position (as shown in FIG. 2A), which moves the sleeve 114 against the bypass valve seat 116, thereby closing the bypass valve 110a. The two-way flow control device 140 prevents the fluid in the biasing member chamber 118a from moving into the reservoir 132a, which maintains the sleeve 114 urged against the bypass valve seat 116. When the two-way flow control device 140 is opened (activated), the high pressure inside the bypass valve 110a acting on the piston 120 moves the piston 120 and thus the bypass sleeve 114 to the left (away from the bypass seat 116), thereby opening the bypass valve 110a.

Figure 3:
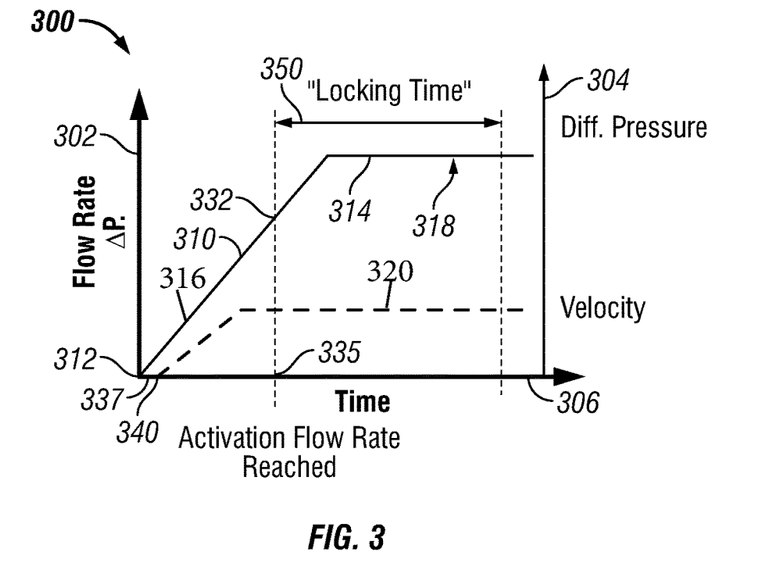
FIG. 3 is a graph showing a pressure differential signal and a rotational signal that in combination may be utilized to open the bypass device of FIG. 1, according to one method of the disclosure.

Referring to FIGS. 1, 2 and 2A, in aspects, the bypass valve 110 or 110a may be opened and closed repeatedly during use of the bypass device 100, 100a or 100b downhole. The bypass valve 110 or 110a may be opened and closed using one or more parameters or characteristics. In a particular configuration, the parameters may be fluid flow rate or differential pressure between the inside and outside of the bypass device 100, 100a or 100b and mechanical motion of the bypass device or another member or device associated therewith. FIG. 3 is a graph 300 that includes a left vertical axis 302 for indicating flow rate or differential pressure 310, a right vertical axis 304 for indicating a speed 320 of a suitable member and a horizontal axis 306 for indicating time Referring to FIGS. 1, 2 and 2A and 3, to open the bypass device 100, 100a or 100b, the flow rate of the fluid 104 is increased from a base level 312 to an upper level flow rate 314. As the flow rate is increased, the differential pressure increases, as shown by the rising section 316 of the flow rate or differential pressure 310 in FIG. 3. At the upper level flow rate 314, the flow rate/differential pressure 310 becomes constant as shown by section 318. In one configuration, the processor 164 may be configured to start a clock or timer when the flow rate/differential pressure 310 reaches a first level (the "activation flow rate level") 332 at time 335. A short time after starting increasing the flow rate/differential pressure 310 (i.e., at time 340 along the axis 306), a speed of the mechanical motion of the bypass device 100, 100a, or 100b or another member associated therewith is brought to a selected value 342. The mechanical motion may be a rotation of the drill string or an axial motion of the drill string. In one aspect, if both the speed 320 of the mechanical motion is detected during the time period and one of the flow rate and differential pressure 310 occurs or is present during a defined time period (also referred to herein as the "locking time") 350, the control circuit 160 activates the flow control device 140/240, thereby opening the bypass valve 110 or 110a to discharge the fluid 204 from the bypass device 100, 100a or 100b to the outside. In one aspect, the bypass valve 110 or 110a remains open as long as the flow rate remains above a predetermined second level (not shown), which second level may or may not be the same as the first level 332 or less than the first level 332. In aspects, the processor 164 may be configured to close the bypass valve 110 or 110a when the flow rate is decreased to the second level. In the method described in reference to FIG. 3, the mechanical motion of the string may be stopped, if desired, without, affecting the operation of the bypass device 100, 100a or 100b. The bypass valve 110 or 110a, in such a case, may remain open. In this scenario, the closing of the bypass valve 110 or 110a is unaffected by a change in the speed of the mechanical motion once the bypass valve 110 or 110a has been opened. In such a case, the closing of the bypass valve 110 or 110a will depend upon the flow rate 310. Also, when the bypass valve 110 or 110a is in the closed position and the flow rate reaches the first level 314 in the locking time 350 and the speed of the mechanical motion of the drill string 320 does not reach the selected value 342, the bypass valve 110 or 110a remains closed.

Figure 4:
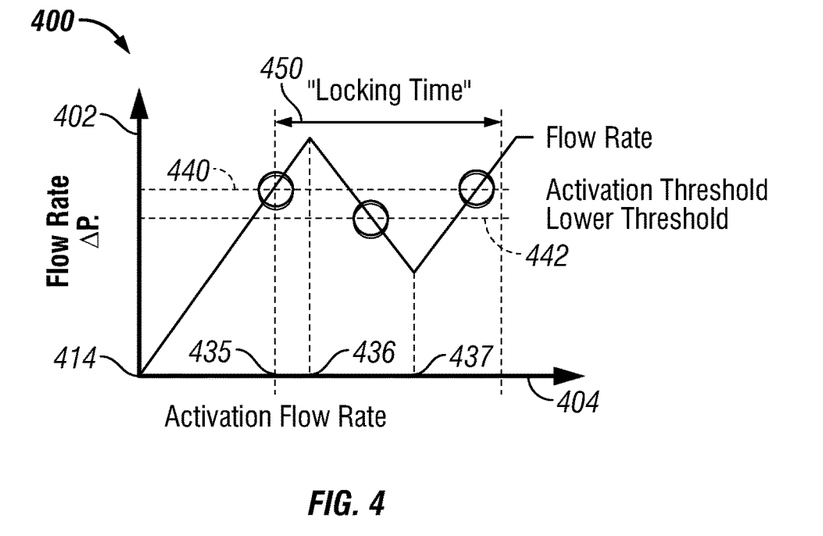
FIG. 4 is graph showing pressure differential signals within a selected time zone that may be utilized to open the bypass device of FIG. 1, according to another method of the disclosure.

FIG. 4 is graph 400 showing flow rate (or alternatively pressure differential) versus time. Referring to FIGS. 1 and 4 for illustrative purposes only, the flow rate or alternatively the pressure differential between the inside and outside of the bypass device 100 is plotted along the vertical axis 402 and the time is plotted along the horizontal axis 404. To open the bypass valve 110 or 110a, at time 414 the flow rate 410 is increased so that it passes a first level (or "upper threshold") 440 at time 435 and reaches an upper value 424 at time 436. The processor 164 starts the time clock at time 435 when the flow rate or differential pressure 410 reaches the first level 440 and starts to count the locking time or time period 450. In other aspects, the locking time 450 may be started prior to or after the flow rate reaches the first level 440. At a certain time after the locking time 450 has started (i.e., at time 436), the flow rate or differential pressure 410 is reduced so that the flow rate or differential pressure 410 falls below a second level (or "lower threshold") 442. In one aspect (the "first case"), the control circuit 160 determines that the flow rate or differential pressure 410 has crossed the first level 440 and has subsequently fallen below the second level 442 within the locking time 450 and then activates the bypass valve 110. In another aspect (the "second case"), after the flow rate or differential pressure 410 has crossed the second level 442 at time 437, the flow rate or the differential pressure 410 may be increased at time 438 to cause it to cross the first level 440 again at time 439 within the locking time 450. In the second case, the control circuit 160 may be configured to open the bypass valve 110 when the flow rate or differential pressure crosses the first level 440, the second level 442 and again the first level 440 within the locking time 450. Thus in the first case, the flow pattern used by the control circuit 160 to open the valve includes the crossing of the first level 440 and the second level 442 within the locking time. In the second case, the flow pattern includes crossing the first level 440, second level 442 and the first level 440 within the locking time. Other flow patterns may also be used within a locking time to open the bypass valve 110. If the bypass valve is closed and the control circuit detects the flow rate has crossed the first level 440 but the defined flow pattern does not occur in the locking time, the control circuit 160 will not open the bypass valve 110.

Figure 5:
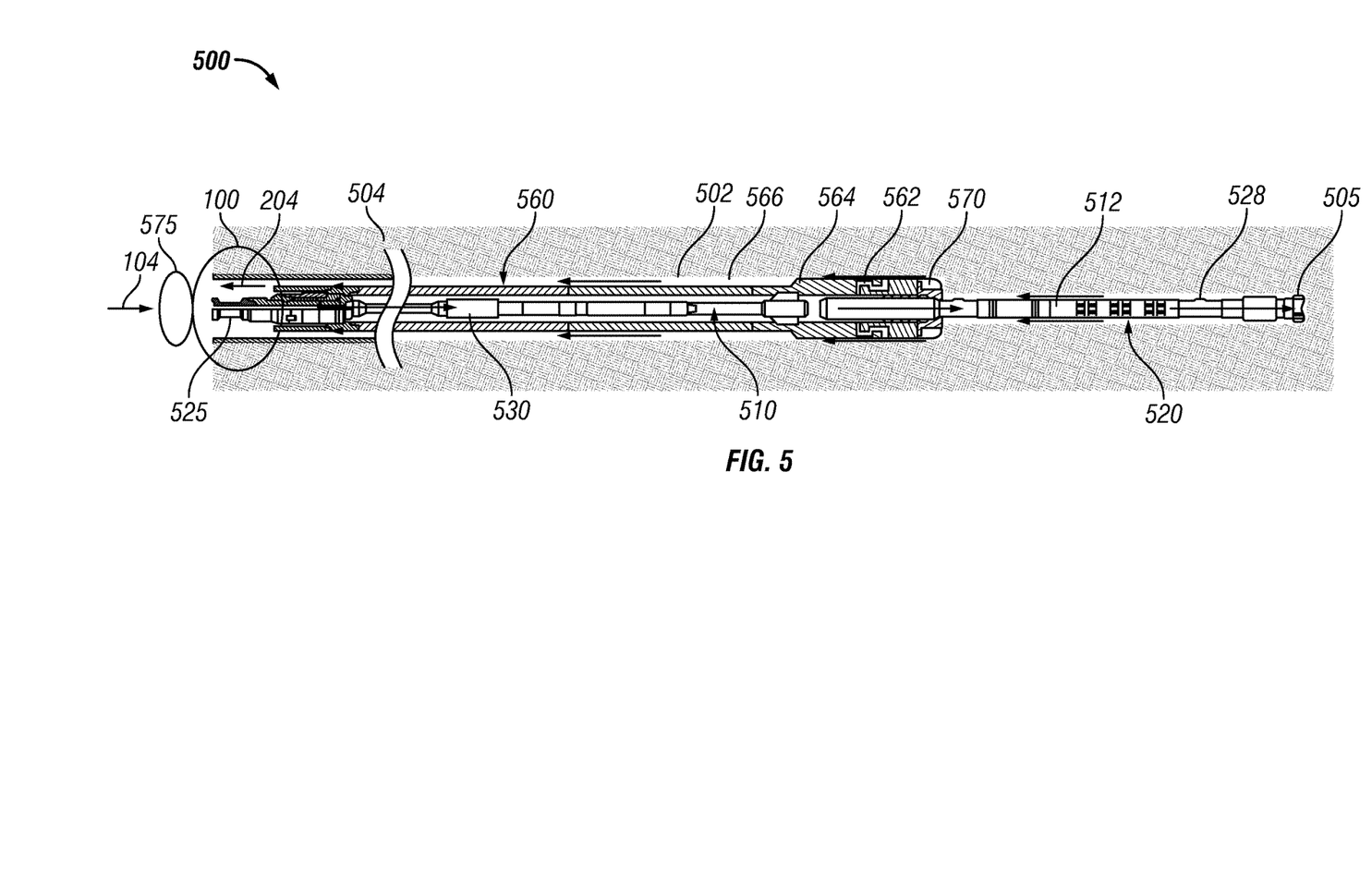
FIG. 5 is an exemplary drill string that may incorporate the bypass device for diverting a portion of the drilling fluid from inside the drill string to an annulus between the drill string and the wellbore.

A bypass device made according to an embodiment of the disclosure may be utilized in any drill string to bypass a fluid flowing through the drill string to the annulus of the wellbore during drilling of a wellbore. FIG. 5 shows an exemplary drill string 500 in which the bypass device, such as device 100 shown in FIG. 1, is placed above or uphole of an exemplary bottom hole assembly 520. The drill string 500 is shown deployed in a wellbore 502 being formed in a formation 504. The exemplary drilling string 500 includes an inner string 510 and an outer string 560. The inner string 510 includes a drill bit 505 attached to the bottom end of a bottomhole assembly 520 that includes a variety of sensor 512 for providing information about the drilling operations and properties of the formation 504. The inner string 510 runs through the inside of the outer string 560. The inner string 510 is attached to the outer string 560 at a location 562 using a suitable attachment inside the outer string 560 so that the drill bit 505 and the sensors 512 extend out from the outer string 560. The bottomhole assembly 512 also may include a steering device 528 configured to steer the drill bit 505 in a particular direction to drill a deviated wellbore. In one aspect, the steering device 528 may include a number of independently operable force application members or ribs that apply varying forces on the wellbore wall to create a force vector along a selected direction to steer the drill bit 505 along a selected direction. Any other steering device may also be used for the purpose of this disclosure. Such steering devices and sensors 512 are known and are thus not described in detail herein. The inner string 510 also includes a power generation and telemetry unit 530 that provides power to the various components of the bottomhole assembly 520 and two-way data communication between the bottomhole assembly 520 and the surface equipment. The outer string 560 includes a reamer bit 570 at a bottom end thereof. The reamer bit 570 is larger in size than the drill bit 505 and is used to enlarge the borehole drilled by the drill bit 505. In one embodiment, the bypass device 100, 100a or 100b may be attached at an upper end 525 of the outer string 560. The outer string is connected to drill pipe or drilling tubular 575. The drilling tubular 575 may be rotated at the surface to rotate the drill bit 505 and the reamer bit 570 to form the wellbore 502. The reamer bit 570 is larger than the outer dimension of the tubular 564, which forms an annulus 566 between the outer string 560 and the well bore 502. During drilling of the wellbore 502, the drilling fluid 104 is supplied under pressure from the surface, which fluid discharges at the bottom of the drill bit 505 and returns to the surface via the annulus 566. When desired, the bypass device 100, 100a or 100b is activated to bypass or divert a portion 204 of the fluid 104 from the inside of the inner string 510 to the annulus 566 in the manner described in reference to FIGS. 1-4.

In aspects, the use of a bypass device made according to an embodiment of the disclosure causes fluid to flow through the annulus uphole of the drill bit 505 and the reamer bit 570. The bypassed fluid 204 aids the flow of the rock cuttings made by the drill bit 505 and the reamer bit 570 through the annulus 566 and thus improves hole-cleaning during drilling of the wellbore 502. As noted above, the bypass device 100, 100a or 100b may be repeatedly activated and deactivated, as desired, during drilling of the wellbore. In other aspects, the drill string embodiments made according the disclosure may include a passage through the bypass device 100, 100a or 100b of sufficient dimensions so that an activation device, such as a drop ball, may be dropped from the surface to set or activate a device, such as a setting tool in the drilling assembly which includes the bottomhole assembly and the drilling tubular. Thus, in the configuration of FIG. 5, the wellbore may be drilled with a steerable liner, the hole-cleaning performed by a bypass device and a device in the drilling assembly may be activated by an activation device, such as drop ball. In other embodiments, the activation device may be a dart or a radio frequency identification device. In other aspects, controllably bypassing the drilling fluid into the annulus allows controlling equivalent circulation density ("ECD") at the bottom of the wellbore. The improved fluid flow through the annulus also can reduce the temperature of the bottom hole assembly 520 (FIG. 5). Additionally, since the bypass device 100, 100a or 100b can be activated and deactivated at any time (repeatedly), the bypass flow may be closed when performing functions, such as anchoring a drilling liner in the wellbore, cementing the annulus while the fluid bypass may be resumed for hole-cleaning or ECD control during drilling of the wellbore. The methods and embodiments described herein can achieve high differential pressure across the bypass device 100, 100a or 100b, such as 200 bars. In aspects, the devices described herein may be operated with a high total fluid flow rate, such as a total fluid flow rate of 2500 liters per minute (LPM) and an inner string fluid flow rate of 1200 LPM. Such a configuration may allow a bypass fluid flow rate of 1300 LPM. Further, the embodiments and methods described herein utilize operating parameters as signals for activating and deactivation the bypass flow, such as fluid flow rate, differential pressure, and speed of the mechanical motion of the drill string. In other aspects, activation of the bypass device may be defined by any combination of signals, such as fluid flow rate or differential pressure plus speed of the mechanical motion of the drill string, a flow rate pattern in a locking time, etc. As noted above, the apparatus and methods disclosed herein provide activation-on-demand of the bypass device by utilizing measurements made by downhole sensors in response to surface-sent signals.

Therefore in one aspect, the present disclosure provides a method of drilling a wellbore, including: drilling the wellbore with a drill string that includes a bypass device having a fluid passage therethrough by supplying a fluid through the bypass device at a first flow rate, wherein the fluid circulates to a surface location via an annulus between the drill string and the wellbore; altering the flow rate of the fluid from the first flow rate to a second flow rate; defining a time period; initiating a mechanical motion of the bypass device; detecting downhole a parameter related to the mechanical motion of the bypass device and detecting a parameter related to flow rate; and activating the bypass device to divert a portion of the fluid to the annulus when the parameter related to mechanical motion of the bypass device is detected and the parameter related to flow rate is present during the defined time period. The parameter related to mechanical motion may include one or more of an axial motion of the bypass device and a rotation of the bypass device, a speed of the mechanical motion, and a pattern of a sequence of mechanical motions of the bypass device. The time period may be initiated when the parameter related to flow rate of the fluid crosses an activation flow rate level. The parameter related to flow rate may include at least one of: (i) a flow rate; (ii) a differential pressure; (iii) a change in flow rate; (iv) a rate of change of the flow rate; (v) a change in the differential pressure; and (vi) a rate of change of the differential pressure. In one embodiment, a first sensor measures the parameter related to flow rate and a second sensor measures the parameter related to mechanical motion of the bypass device. A processor may be used to: determine when the parameter related to flow rate crosses a first level; activate a clock to start the defined time period; determine the parameter related to mechanical motion of the bypass device; and activate the bypass device when the parameter related to mechanical motion of the bypass device is detected and the parameter related to flow rate is above a second level within the defined time period. In one embodiment, an activation device may be conveyed through the bypass device to activate a downhole device. The activation device may be selected from a group consisting of a: drop ball; dart; and radio frequency identification device.

In another aspect, the present disclosure provides a method of drilling a wellbore, including: drilling the wellbore with a drill string that includes a bypass device having a fluid passage therethrough by supplying a fluid through the bypass device, wherein the fluid circulates to a surface location via an annulus between the drill string and the wellbore; defining a time period; altering a parameter related to flow rate according to a selected flow pattern, wherein the flow pattern includes the parameter related to flow rate crossing a first level and the parameter related to flow rate crossing a second level within the defined time period;

determining downhole the selected flow pattern; and activating the bypass device to divert the fluid from the drill string to the annulus when the selected flow pattern occurs within the defined time period. The parameter related to flow rate may include at least one of: (i) a flow rate; (ii) a differential pressure; (iii) a change in flow rate; (iv) a rate of change of the flow rate; (v) a change in the differential pressure; a rate of change of the differential pressure. The defined time period may be initiated when the parameter related to flow crosses the first level. In one embodiment, the flow pattern further includes the parameter related to flow rate again crossing the first level within the defined time period.

In yet another aspect, the present disclosure provides an apparatus for use in a wellbore downhole, including: a bypass device having a passage, wherein the bypass device is configured to pass a fluid supplied thereto through the passage when it is in a closed position and divert a portion of the fluid to an annulus between the bypass device and the wellbore when it is in an open position; a first sensor configured to measure a parameter related to flow rate; a second sensor configured to measure a parameter related to a mechanical motion of the bypass device; and a controller configured to open the bypass device to divert the portion of the fluid from the bypass device to the annulus when the parameter related to mechanical motion of the bypass device is detected and the parameter related to flow rate is present within a selected time period. The first sensor may include at least a pressure sensor or a flow rate sensor and the second sensor may include an accelerometer for measuring at least one of: (i) an axial motion of the bypass device; and (ii) a rotation of the bypass device. The bypass device may include a bypass valve and a hydraulic power unit to open and close the bypass valve and the controller may be configured to control the hydraulic power unit to open and close the bypass valve. In one embodiment, the controller includes a processor configured to: determine when the parameter related to flow rate is at a first level, activate a clock to start the defined time period, open the bypass device when the parameter related to mechanical motion of the bypass device is detected and the parameter related to flow rate is above a second level within the selected time period. In one embodiment, the apparatus further includes a drilling assembly downhole of the bypass device.

While the foregoing disclosure is directed to the preferred embodiments of the disclosure, various modifications will be apparent to those skilled in the art. It is intended that all variations within the scope and spirit of the appended claims be embraced by the foregoing disclosure.

The invention claimed is:

1. A method of drilling a wellbore, comprising:
drilling the wellbore with a drill string that includes a bypass device having a fluid passage therethrough by supplying a fluid through the bypass device at a first flow rate, wherein the fluid circulates to a surface location via an annulus between the drill string and the wellbore;
altering the flow rate of the fluid from the first flow rate to a second flow rate;
defining a time period;
initiating a mechanical motion of the bypass device;
detecting downhole a parameter related to the mechanical motion of the bypass device and detecting a parameter related to flow rate;
providing one of a first sensor for determining the parameter related to flow rate and a second sensor for determining the parameter related to mechanical motion of the bypass device; and
activating the bypass device to divert a portion of the fluid to the annulus when the parameter related to mechanical motion of the bypass device is detected and the parameter related to flow rate is present during the defined time period.

2. The method of claim 1, wherein the parameter related to mechanical motion includes at least one of: (i) an axial motion of the bypass device; and (ii) a rotation of the bypass device.

3. The method of claim 1, wherein the parameter related to mechanical motion of the bypass device further comprises one of: a speed of the mechanical motion, and a pattern of a sequence of mechanical motions of the bypass device.

4. The method of claim 1 further comprising initiating the defined time period when the parameter related to flow rate of the fluid crosses an activation flow rate level.

5. The method of claim 1, wherein the parameter related to flow rate is one of: (i) a flow rate; (ii) a differential pressure; (iii) a change in flow rate; (iv) a rate of change of the flow rate; (v) a change in the differential pressure; and (vi) a rate of change of the differential pressure.

6. The method of claim 1 further comprising using a processor to: determine when the parameter related to flow rate crosses a first level; activate a clock to start the defined time period; determine the parameter related to mechanical motion of the bypass device; and activate the bypass device when the parameter related to mechanical motion of the bypass device is detected and the parameter related to flow rate is above a second level within the defined time period.

7. The method of claim 1 further comprising initiating the defined time period when the parameter related to flow rate of the fluid crosses a first level, and activating the bypass device when the parameter related to mechanical motion of the bypass device is detected and the parameter related to flow rate is above a second level.

8. The method of claim 7, wherein the second level is one of: (i) the same as the first level; and (ii) less than the first level.

9. The method of claim 1 further comprising conveying an activation device through the bypass device to activate a downhole device.

10. The method of claim 9, wherein the activation device is selected from a group consisting of a: drop ball; dart; and radio frequency identification device.

11. An apparatus for use in a wellbore downhole, comprising:
a bypass device having a passage, wherein the bypass device is configured to pass a fluid supplied thereto through the passage when it is in a closed position and divert a portion of the fluid to an annulus between the bypass device and the wellbore when it is in an open position;
a first sensor configured to measure a parameter related to flow rate;
a second sensor configured to measure a parameter related to a mechanical motion of the bypass device; and
a controller configured to open the bypass device to divert the portion of the fluid from the bypass device to the annulus when the parameter related to mechanical motion of the bypass device is detected and the parameter related to flow rate is present within a selected time period.

12. The apparatus of claim 11, wherein the first sensor includes at least a pressure sensor or a flow rate sensor and the second sensor includes an accelerometer for measuring at least one of: (i) an axial motion of the bypass device; and (ii) a rotation of the bypass device.

13. The apparatus of claim 11, wherein the bypass device further comprises a bypass valve and a hydraulic power unit to open and close the bypass valve and wherein the controller is further configured to control the hydraulic power unit to open and close the bypass valve.

14. The apparatus of claim 11, wherein the controller includes a processor configured to: determine when the parameter related to flow rate is at a first level, activate a clock to start the defined time period, open the bypass device when the parameter related to mechanical motion of the bypass device is detected and the parameter related to flow rate is above a second level within the selected time period.

15. The apparatus of claim 11 further comprising a drilling assembly downhole of the bypass device.

* * * * *